Dec. 15, 1931.  W. L. DELANEY  1,836,751
DUST GUARD CUTTING MACHINE
Filed Feb. 6, 1930   5 Sheets-Sheet 3
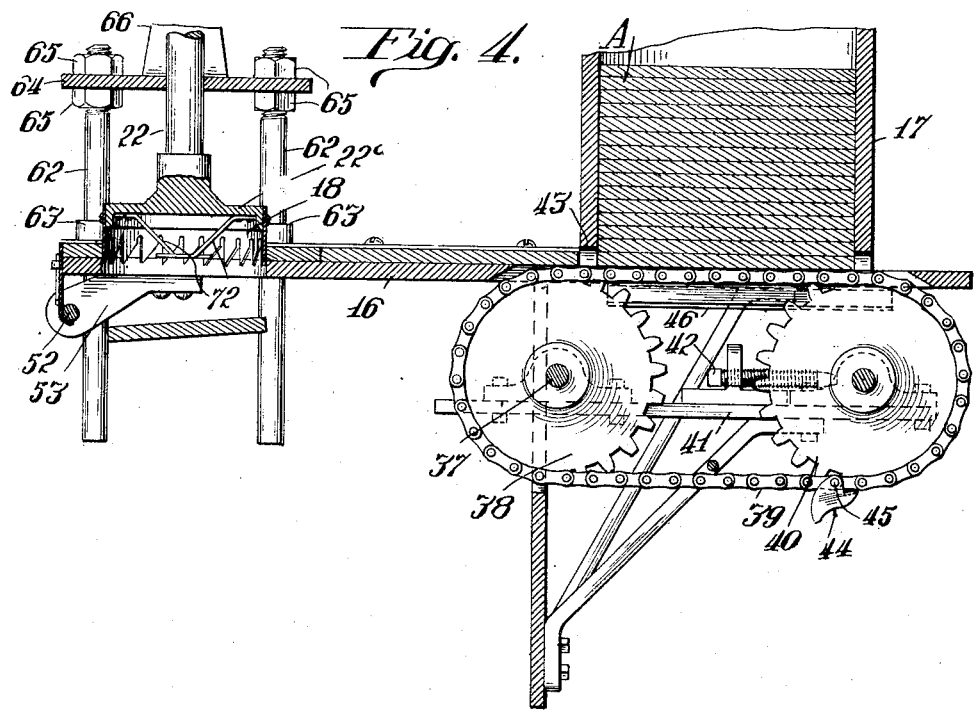
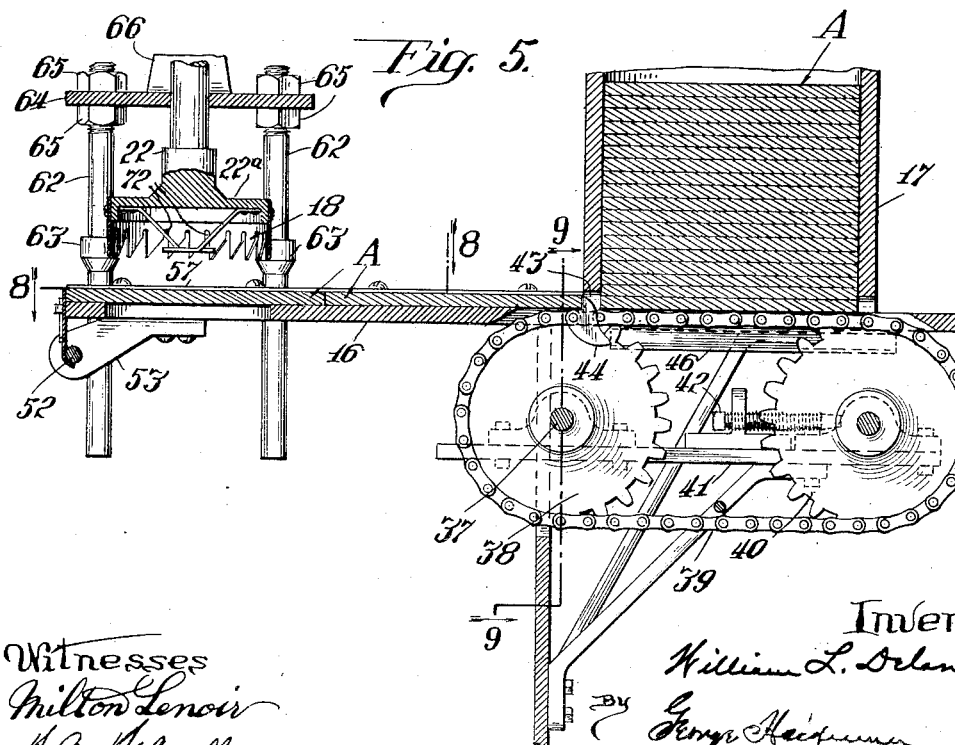

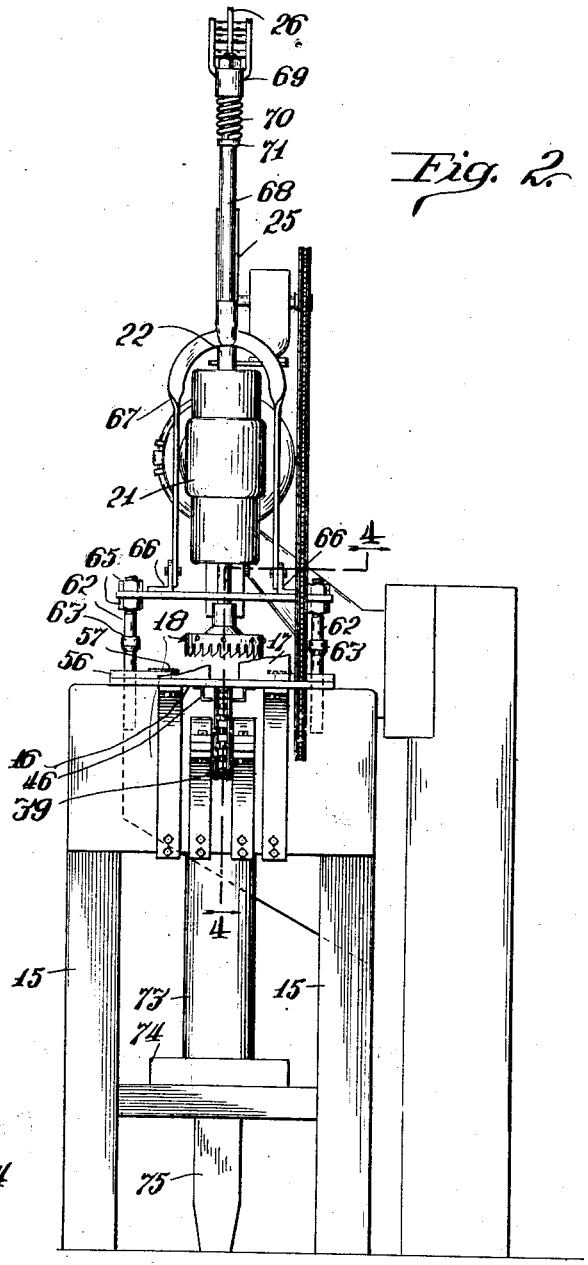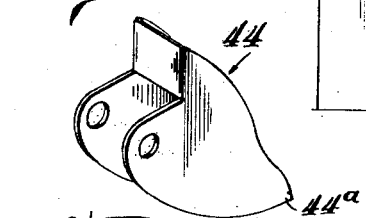

Dec. 15, 1931.  W. L. DELANEY  1,836,751
DUST GUARD CUTTING MACHINE
Filed Feb. 6, 1930  5 Sheets-Sheet 4
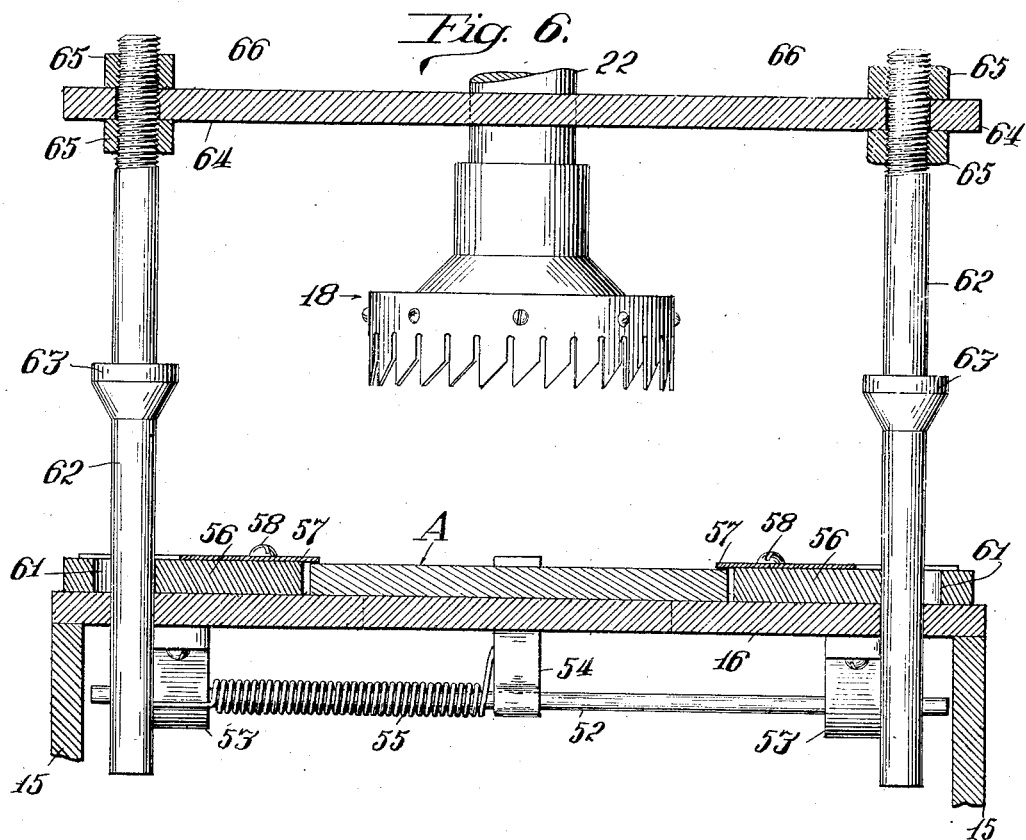
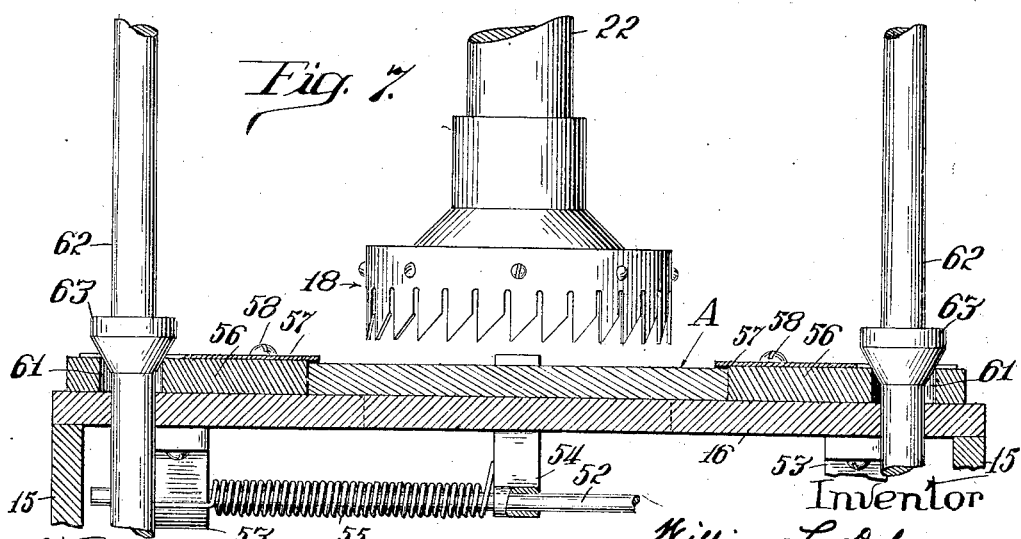

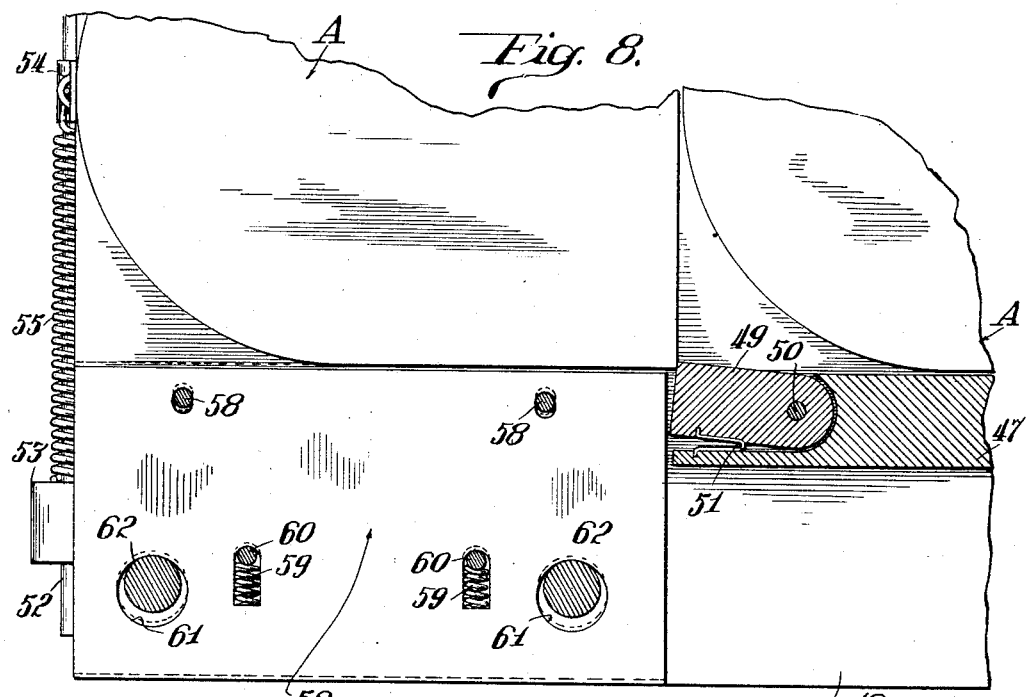
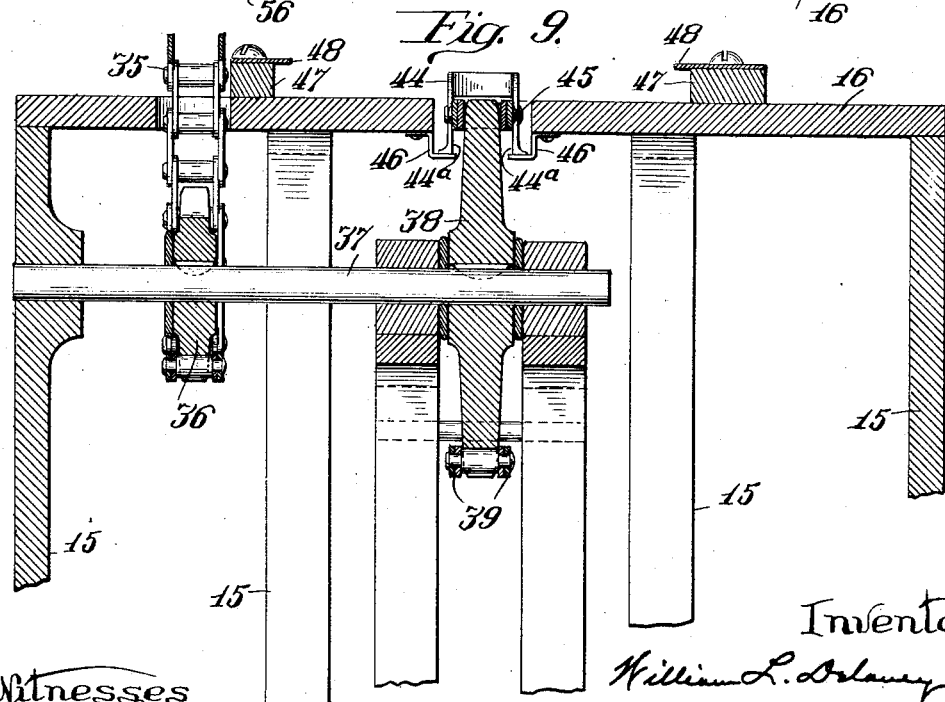

Patented Dec. 15, 1931

1,836,751

UNITED STATES PATENT OFFICE

WILLIAM L. DELANEY, OF TACOMA, WASHINGTON

DUST GUARD CUTTING MACHINE

Application filed February 6, 1930. Serial No. 426,200.

My invention relates to a machine for cutting the circular opening in the previously cut blanks for passage of the car journal; the machine involving means for automatically feeding the blanks successively, one by one, from a superposed lot to the cutting mechanism, automatically clamping each blank in position for the cutting operation, advancing the finished guard to a nesting and compressing portion of the machine, while automatically also removing the cut-out center from the cutting mechanism.

The operation, as well as the objects and advantages of my invention, will be readily comprehended from the following detailed description of the drawings, wherein:—

Figure 2 is an end elevation of the machine.

Figure 3 is a detail perspective view of one of the guard-blank advancing members.

Figure 4 is a detail sectional view taken substantially on the line 4—4 of Figure 2, as viewed by the arrows.

Figure 5 is a similar view taken along the same line as Figure 4, but illustrating the mechanism positioned either before or after completion of the cutting operation.

Figure 6 is a detail sectional view of the cutting and blank clamping means before the clamping and cutting operations begin.

Figure 7 is a similar view showing the clamping operation completed and the cutting mechanism practically in position to begin its cutting operation.

Figure 8 is a detail sectional view taken substantially along the line 8—8 of Figure 5, as viewed by the arrows.

Figure 9 is a detail sectional view, taken substantially along the line 9—9 of Figure 5, as viewed by the arrows.

Figure 1:
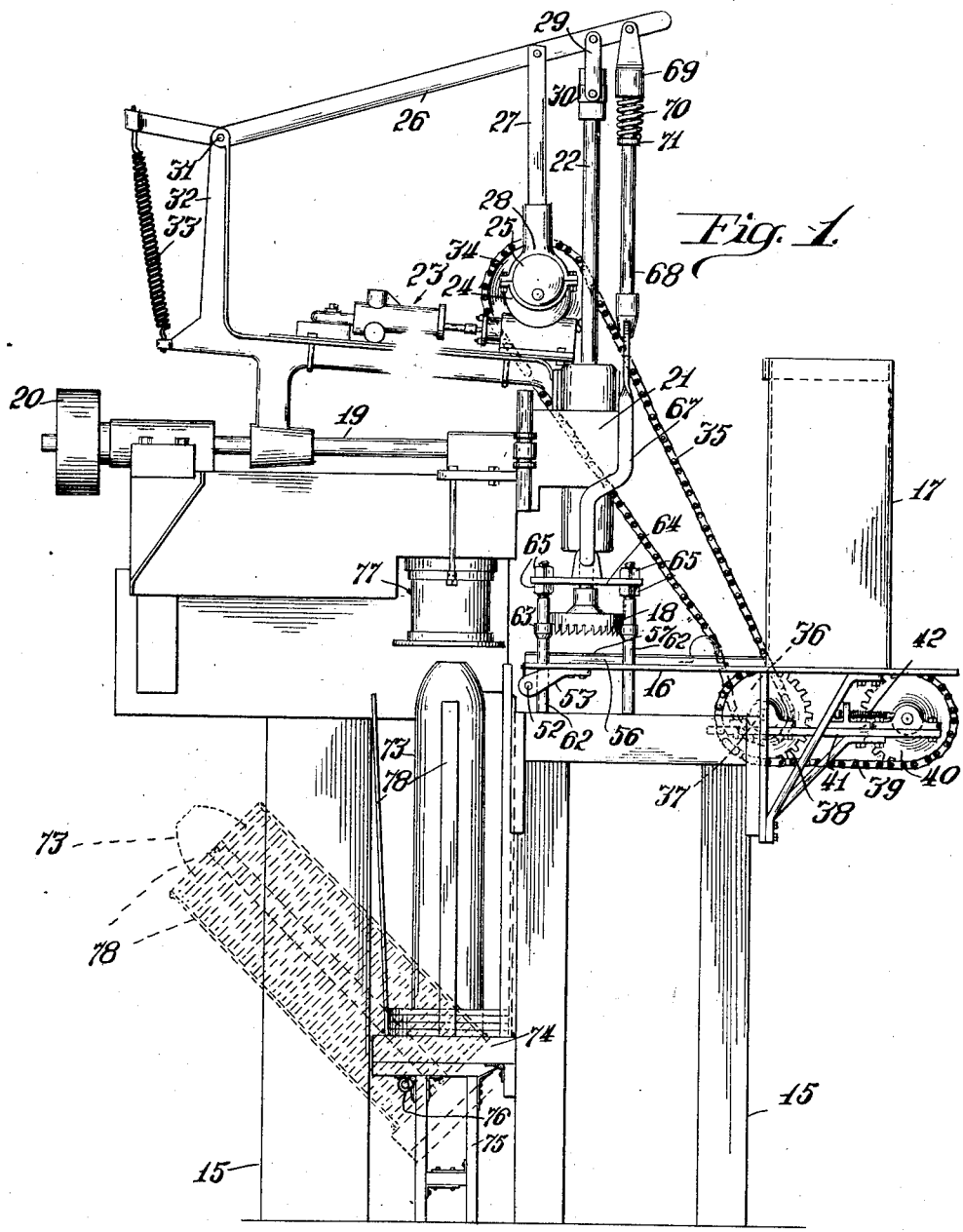
Figure 1 is a side elevation of my improved machine; and in dotted lines indicating a nested lot of completed guards in position for removal.

My invention relates to a machine for cutting out the centers of previously cut blanks, of wood or other suitable material, intended for use as dust guards on railroad car journals.

In the particular exemplification of the invention, this involves a suitable supporting frame and standards 15, for supporting the operating elements as well as the table portion 16 along which the blanks A are made to pass from a suitable hopper 17 containing the superposed blanks or panels A, as shown in Figures 4 and 5. Dust guards of the type here in question, as is well known, are provided with a straight end and with a rounded end; and the various blanks or panels (previously cut to size and with the prescribed ends) are stacked in the hopper 17 with their rounded end disposed toward the cutting mechanism or annular saw 18.

The machine is provided with a suitable drive shaft 19 provided at one end with a pulley 20 to be driven from any suitable source of power.

The cutting mechanism or annular saw is rotated by any suitable type of gearing arranged intermediate of drive shaft 19 and the saw spindle; said gearing being located in gear housing 21; illustration of the gearing being deemed unnecessary, as any proper gearing may be employed for rotating the saw 18 at the desired speed and which will also permit of the desired up-and-down movement of the saw during operation; and for that reason the saw 18 is provided with the elongated spindle 22 which extends through the gear housing 21.

The up-and-down travel of spindle 22 with its saw 18 is accomplished by any suitable variable speed electric motor or an air motor, as generally indicated at 23, and operating a proper reduction gear 24—for example a fifty-to-one whose high speed side is connected to the motor and to which eccentric 25 is connected.

Eccentric 25 in turn is connected to a lever 26 by means of rod 27 and eccentric strap 28. Lever 26 is also connected to the saw-spindle 22 by means of connection 29 and bearing 30, thereby giving spindle 22 and the saw 18 up and down travel as lever 26 oscillates about its fulcrum point 31 provided by the upstanding arm 32 of the frame of the machine; the end of the lever 26 being shown extended beyond its fulcrum point 31 and provided with a suitable contracting spring 33 for assisting in the return or upward lifting movement.

The reduction gear 24 also operates a sprocket 34 provided with a sprocket chain 35 for driving a sprocket 36. Sprocket 36 is mounted on shaft 37 provided with a sprocket 38 having a chain 39 which passes about a similar sprocket 40. The sprocket mechanism just referred to is properly timed in keeping with the reciprocatory or up-and-down travel of the saw 18. In order that the sprocket chain 39 may be maintained sufficiently taut, I show the bearing for sprocket 40 slidably mounted on the supporting frame 41 and the bearing blocks controlled by the adjustable screw or bolt 42 (Figures 4 and 5).

The sprocket and chain mechanism just referred to is mounted beneath the bottom of hopper 17 which has an opening at the forward lower end sufficient for the passage of a single blank or panel A therethrough, as shown at 43 in Figures 4 and 5; and the hopper at the rear lower end also has an opening for the passage of suitable dogs which are pivotally connected to the chain 39; one of the dogs being shown at 44 in Figure 4.

These dogs are connected to the chain by means of a pin 45 passing through the chain and are allowed to swing freely; it being understood that the sprocket wheels 38 and 40 with the sprocket chain 39 are positioned so that chain 39 will ride centrally beneath the lowermost blank or panel A in the bottom of the hopper 17. The dogs are arranged on the chain at proper distances apart commensurate with the operations of the machine; and these dogs are bifurcated so as to straddle the chain and present a comparatively wide face across the top of the chain to engage the plain, flat end of the lowermost blank or panel in the hopper (see Figure 9). The two depending sides of the dog curve slightly rearward, as shown at 44ª in Figures 4 and 9, so as to ride along a trackway arranged on the lower side of the table 16. This trackway, in the particular exemplification, consists of a pair of angle members 46, 46 (see Figure 9), which extend from the rear sprocket wheel 40 to the forward sprocket-wheel 38; namely substantially throughout the length of the slot in the table 16. It is apparent that with the depending tail portions 44ª, 44ª riding along the trackway, rearward movement of the upper main portion of the dog 44 is impossible and as a result the upstanding portion of the dog will remain in contact with the rear end of the panel or blank A and force it forward out of the bottom of the hopper 17 as the sprocket chain is operated.

The travel of the dog is sufficient to move a blank or panel entirely through the forward opening in the bottom of the hopper, so that when the dog is moved to engage the next blank or panel, this second blank will force the blank previously advanced to proper position beneath the saw. That is to say, the relation between the hopper and the downward path of the saw is such that a blank or panel will be disposed between the stacked panels in the hopper and the cutting zone.

The top of table 16 is provided with a guideway for the blanks or panels and consisting, for illustration, of the blocks 47 of substantially the same thickness as the panel and spaced apart on opposite sides of the table sufficiently to permit the panels to slide therebetween. These blocks 47, in turn, are shown provided with overhanging metal strips 48 secured to the blocks; the strips 48 overlapping the panel A, as shown in Figure 9, so as to maintain the latter flush with the table-top.

The forward ends of each block 47, namely the end disposed adjacent to the cutting zone of the machine, are each provided with a pivoted section 49, beneath the top strip 48, see Figures 8 and 9. The section 49, at its rear end, is held in place by the vertical pin 50 to permit the forward end of the section to swing laterally outward into the panel pathway. The forward ends of the sections are normally forced outward by means of a suitable spring as shown at 51 in Figure 8.

It is apparent from the construction shown that as soon as the panel, intermediate of the hopper and the cutting zone, has forced the preceding panel into the cutting zone (as shown in Figure 8) the sections 49 (because of the rounded end of the intermediate panel) will be forced outwardly by their springs and engage the rear end of the panel which has been advanced into the cutting zone and hold said panel against rearward movement.

In order to firmly hold the respective panels in proper place in the cutting zone and prevent too far forward movement thereof, I provide stop mechanism at the forward end of the machine. This stop mechanism is shown consisting of a rod 52 suitably journaled in brackets 53. The rod 52 is provided with an upstanding finger 54 (see Figures 6 and 7) which normally extends above the table top into the path of the panels and therefore engages the forward rounded end of the panel A which has been brought into the cutting zone.

The rod 52, which is free to rotate in the brackets 53, is shown provided with a coil spring 55, one end whereof is held by a bracket 53, while the other end is secured to the upstanding finger 54. The spring is placed on the rod under tension so as to normally hold the finger upward against the forward end of the table, as shown in Figures 6 and 7.

The table, at the forward end or cutting zone, is also provided with a blank holding guideway shown consisting of suitable blocks 56 of thickness commensurate with the thickness of the blanks.

The tops of these blocks, which are arranged on opposite sides of the blank pathway, are provided with the overhanging strips or plates 57, see Figures 6 and 7.

The blocks 56 are slidably secured to the table top by proper screws or bolts 58 which extend through slots in the blocks, as shown in Figure 8; and these blocks are yieldingly held in normal position,—namely in spaced apart condition sufficient to permit a blank or panel to freely enter therebetween,—by suitable springs 59, arranged in slots in the blocks with one end of each spring bearing against a small upstanding lug or pin 60 secured to the table-top while the other end of each spring 59 engages the end of the slot in the block and forces the latter laterally outward in normal position.

The blocks 56 on each side of the panel or blank pathway are provided with openings 61, for the passage of pins 62 therethrough; the pins 62 also extending through suitable holes in the table. These pins 62 hold the blocks 56 against too far lateral outward movement. The pins 62 are each provided with tapered or cone-shaped enlargements 63 (see Figure 5) arranged to partially enter the openings 61 in the blocks when the pins are depressed.

As these conical enlargements 63 enter the openings 61, they cause the blocks 56 to be moved inwardly against the action of springs 59 and thus force the blocks 56 into firm clamping engagement with the opposite sides of the blank or panel A which has been forced into the cutting zone.

Hence, together with finger 54 and spring controlled sections 49 the blank or panel is firmly held in place against movement during the cutting operation.

In the particular exemplification, I employ two pins 62 for each block 56 on opposite sides of the machine and the pins on opposite sides are in turn controlled so as to operate in unison by plate 64; the pins having nuts 65 screwed thereon and disposed above and beneath the plate so as to firmly hold the respective elements in place against independent movement.

The top of connecting plate 64 has a pair of angle brackets 66 secured at opposite sides and these brackets 66 have a yoke member 67 pivotally secured thereto, as shown in Figure 1. The yoke member 67 is adapted to extend on opposite sides of the gear housing 21 and are bent rearwardly as shown in Figure 1 so as to permit rod 68 to be operatively connected with the upper intermediate portion of the yoke. The rod 68 extends into a coupling member 69 which is pivotally connected to lever 26 beyond the point of connection between the lever 26 and the saw-spindle 22, as shown in Figure 1.

In order to compensate for the extra downward travel of the saw spindle and the saw and also to take care of any irregularities in the dust guard blanks, the downward force of lever 26 is transmitted to rod 68 through the medium of spring 70 which encircles the rod 68 and is held in position by the collar 71, adjustably secured on the rod 68.

The enlargements or conical off-sets 63 are adjusted or arranged on the pins 62 so as to come into operating relation with the movable clamp blocks 56 sufficiently in advance of the operative relation between the saw 18 and the dust guard blank or panel in order that the enlargements 63 will have forced the blocks 56 into firm engagement with the sides of the blank.

Downward movement of lever 26 and the coupling member 69 will compress spring 70 and yieldingly force rod 68 downwardly; the spring 70 permitting further downward movement of lever 26 during the cutting operation induced by eccentric 25, eccentric strap 28 to which rod 27 is secured and which rod is also pivotally secured to lever 26, all as shown in Figure 1.

The saw 18 is an annular saw suitably secured to the lower head 22ª of spindle 22; and this head on its lower side and within the circle defined by the saw, is provided with a spring presser foot 72, see Figures 4 and 5, arranged centrally within the saw and adapted to engage with the central portion to be cut out of the dust guard blank by the saw 18. The spring presser foot 72 will force the center from the dust guard, as soon as the saw has completely cut the blank.

These operations are completed at the completion of the downward stroke of lever 26; and after the lever 26 with spindle 22 have risen sufficiently for saw 18 to clear the cut dust guard, spring 70 will be relieved of compression, permitting rod 68 to be lifted by coupling member 69, thereby causing plate 64 to lift pins 62 and move the conical enlargements 63 out of the holes 61 in the clamping blocks 56.

The blocks 56 are then returned to normal position, namely out of clamping engagement with the sides of the cut dust-guard, by the action of the springs 59. This allows the cut and finished dust-guard to be forced out of the cutting zone by the next succeeding dust-guard blank or panel, which in turn is being forced forwardly by the blank being fed from the bottom of the hopper 17 by the sprocket-chain dog 44.

The mechanisms employed for performing the various operations mentioned are all timed so that a blank or panel will remain in the cutting zone long enough to complete the cutting and releasing operations before the blank feeding mechanism has been brought to blank advancing condition. That is to say, the positioning of a blank forward of the hopper in the intermediate zone and thence into the cutting zone are intermittent and timed in keeping with the complete cycle of operations of the clamping and cutting mechanisms.

The finished or cut dust guard being forced forwardly by the succeeding blank causes the spring controlled finger 54 to tilt downwardly and allows the dust-guard to ride across the top of the finger, which immediately swings upwardly into place when it passes the rear end of the dust-guard and is in position to engage the forward rounded end of the next blank so as to hold it against endwise movement and therefore against the spring controlled trackway sections 49.

Adjacent the forward delivery end of the machine, I provide a dust-guard nesting device consisting of an upright pole 73.

This is secured on a platform 74 which is hinged in place to permit the platform and pole to be tilted downwardly into about a forty-five degree position, as shown in dotted lines in Figure 1; the platform being supported in place by a spring-controlled supporting standard 75 which may be swung laterally from beneath the platform; the standard being returned to normal supporting position by spring 76.

The top of pole 73 is shown tapered so as to more readily enter the cut-out center of the dust guards as the latter are discharging from the cutting zone of the machine; the discharging dust-guards being guided toward the nesting pole 73 by the spring-controlled finger 54 over which the guards ride as they leave the cutting zone.

The pole 73 is of length adapted to hold a predetermined number of dust-guards to constitute a crate, which in practice is preferably fifty dust-guards to a crate. As soon as the pole 73 has received the predetermined number of dust-guards, the dust-guards are pressed firmly together by suitable pressure means, for example by the air operated press shown at 77. While press 77 is still in contact with the pile of dust guards, the superposed dust-guards are crated by means of three suitable strips 78 which are nailed to the top and bottom dust-guards on opposite sides and at one of the ends of the guards.

Press 77 is then released and moved upwardly and standard 75 is swung out of supporting position, thus allowing the platform 74 with its superposed pole 73 and the crated dust-guards to be swung or tilted into the position shown in dotted lines in Figure 1, which permits the crated dust-guards to be removed upwardly from the pole. The pole and platform are then lifted or swung upwardly which causes the standard 75 to swing back into supporting position, so that the nesting mechanism is again in position to receive the cut dust-guards as they are delivered from the machine.

I have shown what I believe to be a simple embodiment of my invention, which has been described in terms employed merely as terms of description and not as terms of limitation, as structural modifications are possible and may be made without, however, departing from the spirit of my invention.

What I claim is:

1. In a dust guard cutting machine having a table provided with a blank feeding zone at one end and a cutting zone at the other end; the feeding zone comprising a hopper adapted to hold a plurality of blanks and having a discharge opening at the lower end, the combination of a traveling endless element provided with loosely mounted blank engaging dogs arranged beneath said hopper, a track-way adapted to engage the lower ends of said dogs to hold the same in upright position until the dogs reach the outlet opening of the hopper, whereby the lowermost blank is fed out of said hopper; the cutting zone comprising blank clamping means arranged on opposite sides of said zone, said means involving laterally movable blocks normally held out of clamping position by springs, said blocks being provided with openings, vertically reciprocable plungers provided with tapered enlargements adapted to enter said openings and thereby force the blocks into clamping position; an annular saw reciprocably arranged above said zone, power means comprising a drive shaft for rotating said saw, a tiltable lever, a cam shaft, an eccentric strap about said cam shaft and connected with said lever, saw carrying spindle operatively connected with said lever, driving mechanism between the power means and the endless element whereby the latter is given intermittent motion; and means intermediate of said lever and said plungers of the clamping means whereby the plungers are reciprocated and the clamping blocks moved laterally.

2. In a dust guard cutting machine the combination of a table provided with a hopper at one end adapted to hold a plurality of blanks and having a discharge opening at bottom; an endless element arranged to travel beneath said hopper and provided with loosely mounted blank engaging means; a track beneath the table whereby said means is held in blank engaging position during a predetermined portion of the travel of said endless element and the lowermost blank fed out of said hopper; with guideways on the table adapted to receive the blanks as they are fed from the hopper, a portion of said guideways being pivoted and under spring pressure to normally extend into the path of the blank to engage the rear end of the advanced blank and prevent rearward movement thereof; a vertically movable spring controlled finger disposed at the end of the table in the path of the blank adapted to engage the forward end thereof to position the same against said pivoted portion of the guide-way, laterally movable blank clamping members arranged beyond said guideways, provided with openings and adapted to engage the sides of the blank, said members being normally held out of clamping position; reciprocating plungers with enlarged surfaces adapted to enter the openings in said clamping members and thereby force the latter inwardly into blank engaging position; a vertical spindle provided with an annular saw at the lower end; power means whereby said spindle is rotated, said power means involving a cam shaft, an eccentric strap, a tiltable lever to which the strap is operatively connected, means whereby said spindle with the saw is reciprocated, means connected to said lever adapted to move the plungers so as to force the clamping members into clamping position in advance of contact of the saw with the blank, and means intermediate of said power means and the endless element for actuating the latter.

3. A dust guard cutting machine the combination of a table provided with a hopper at one end adapted to hold a plurality of superposed blanks and having a discharge opening at the lower end; means mounted beneath the hopper for feeding the lowermost blank out of the hopper; a guideway for the fed blank, blank clamping means beyond the guideway; a saw carrying spindle rotatably and reciprocably located above the table; means for moving the clamping means into clamping engagement with opposite sides of the blank; power means for rotating the saw-carrying spindle; means whereby the spindle is reciprocated and the first mentioned means intermittently actuated; a finished dust guard receiving spindle disposed vertically at the end of the table so as to receive the cut dust guards as they move from beneath the saw.

4. A dust guard cutting machine comprising a table provided with a hopper adapted to hold a plurality of superposed blanks and having a discharge opening at the lower end; means whereby the lowermost blank is fed from the hopper through said opening; a guideway on the table for the fed blank; blank clamping means yieldingly secured to the table at one end of said guideway; reciprocable means arranged above the table and adapted to control the clamping position of said blank clamping means; an annular saw-carrying spindle arranged above said table; power operated means for rotating said spindle; power means for actuating said blank feeding means and for inducing reciprocatory movements of said reciprocable means and said spindle; dust guard nesting means arranged at the end of the table adjacent to the blank cutting portion thereof; and power operated means whereby the nested dust guards may be placed under compression.

5. A dust guard cutting machine comprising a table provided with blank guiding means; a blank holding element arranged at one end of the guiding means; means whereby the blanks are successively fed to the guiding means; blank clamping means arranged at the opposite end of the guiding means; means whereby said clamping means is moved into clamping position; a saw carrying spindle arranged above the table; power means for rotating said spindle; power operated means for intermittently actuating said blank feeding means and said fourth mentioned means and for reciprocating said spindle; a dust guard receiving spindle disposed at the delivery end of the table for receiving a predetermined number of cut dust guards; and power means whereby the nested dust guards on said spindle may be compressed.

6. A dust guard cutting machine comprising a table provided with a blank slideway; means arranged at one end of the slideway for holding a plurality of blanks; means whereby the blanks are successively fed to said slideway; blank clamping means arranged on the table at the opposite end of said slideway; automatically operable means adapted to engage opposite ends of the blank to position the latter in advance of the clamping operation; reciprocable means for moving the clamping means into blank clamping position; a saw carrying spindle arranged above the table; power means for rotating said spindle; a pivoted lever disposed above the table and to which the spindle is operatively connected so as to be reciprocated thereby; power means for oscillating said lever and for intermittently actuating the blank feeding means; and means yieldingly connected to said lever so as to be reciprocated and thereby move the clamping means into blank clamping position.

WILLIAM L. DELANEY.